Patented Feb. 23, 1926.

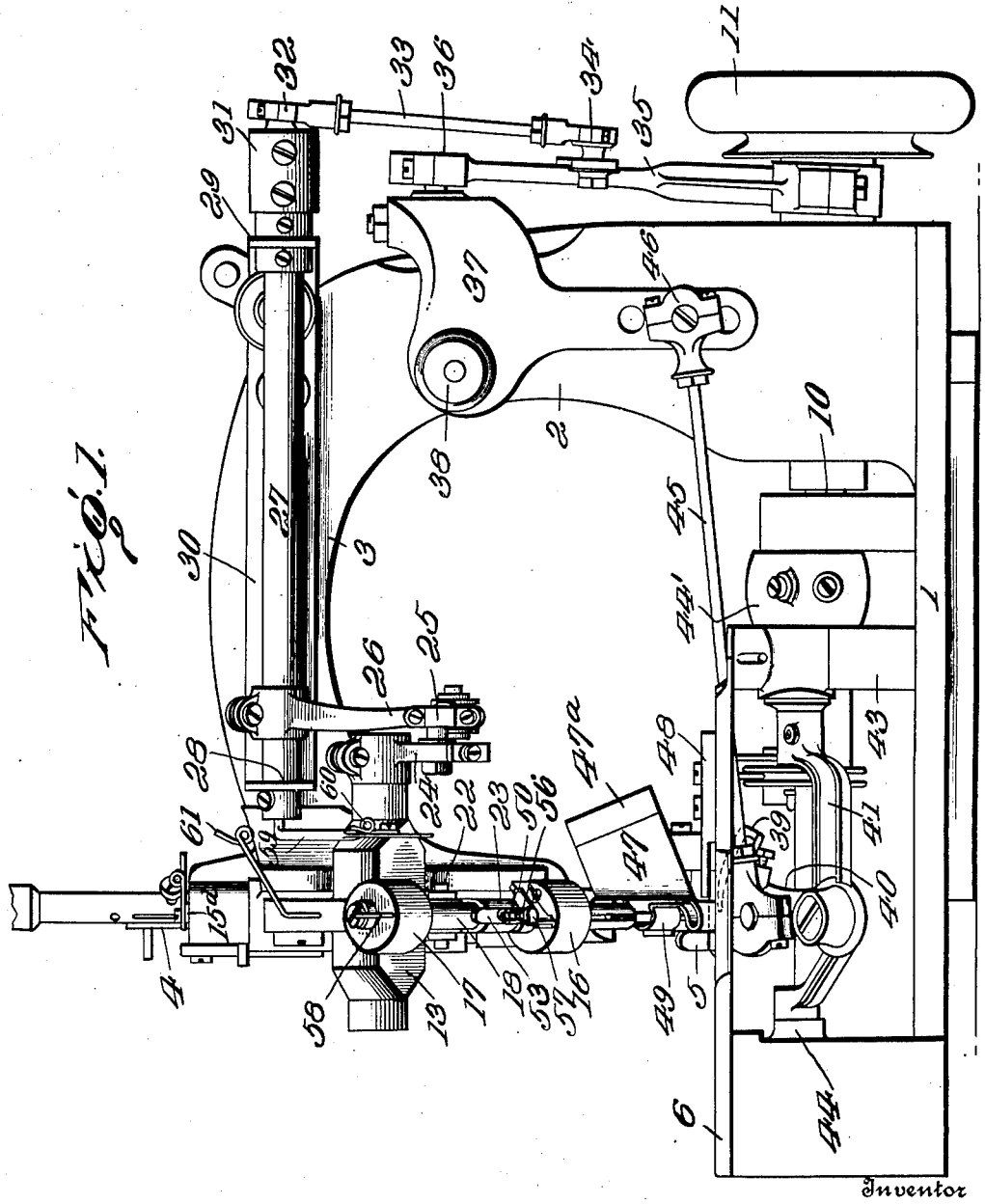

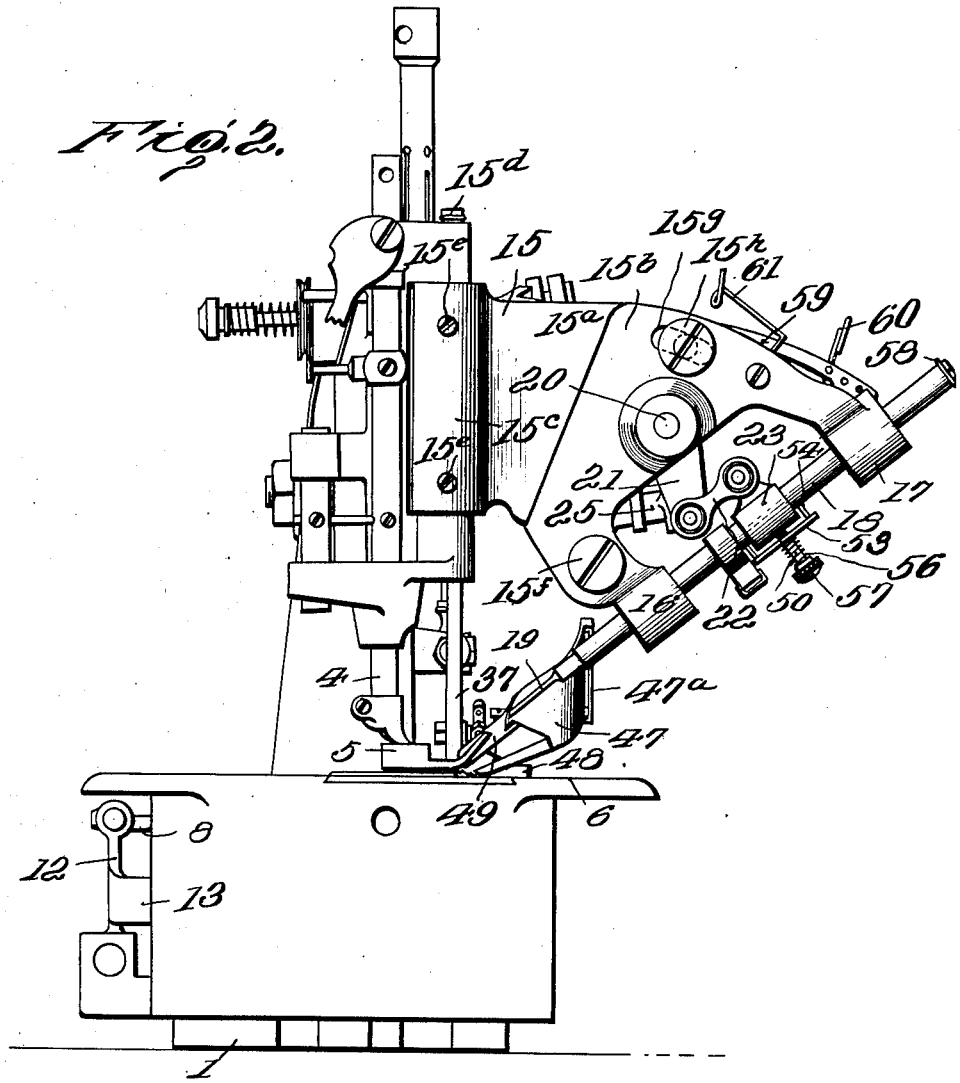

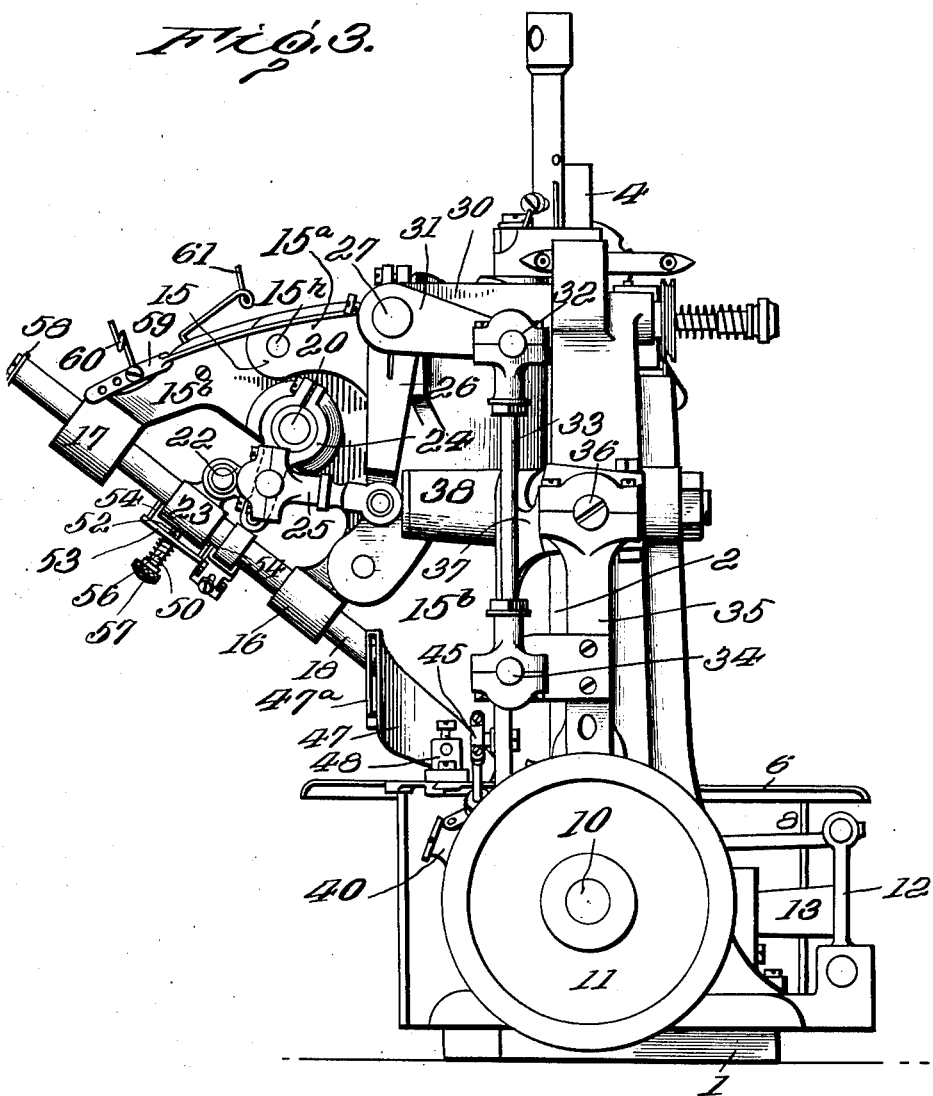

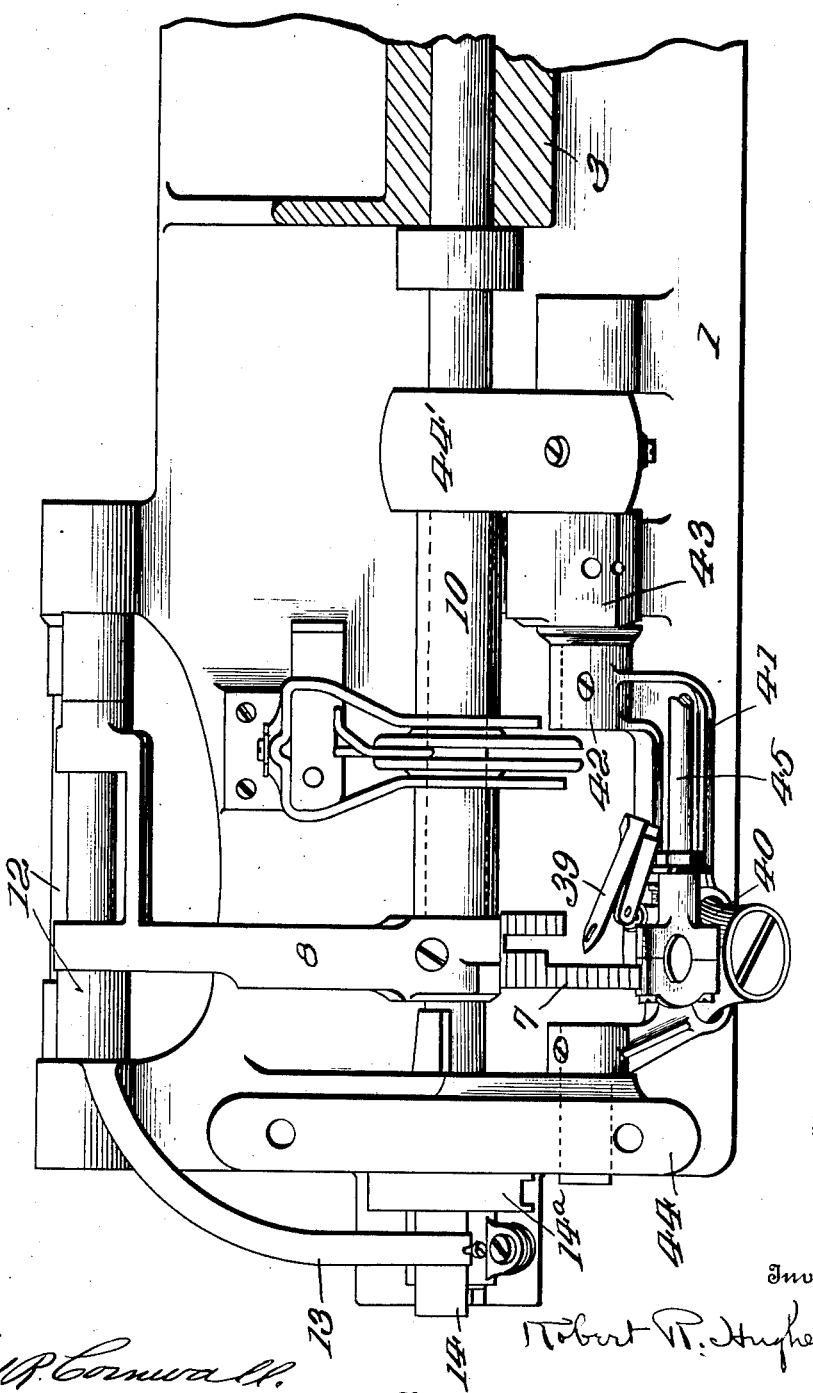

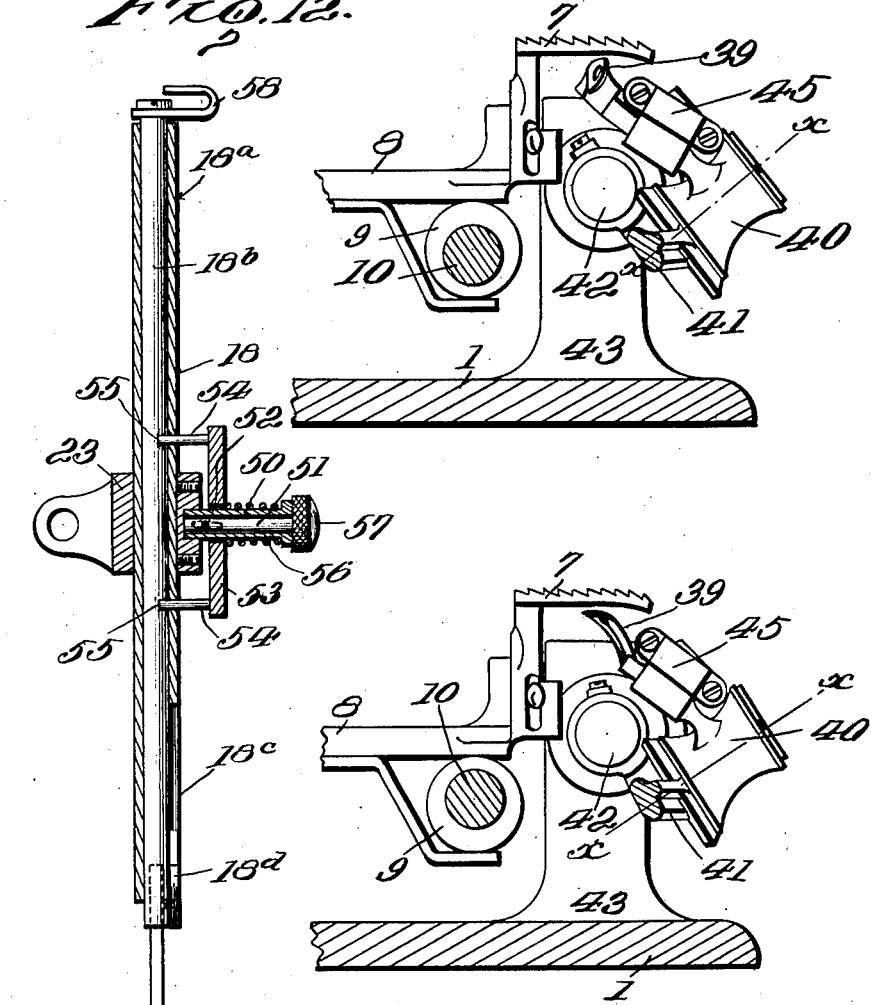

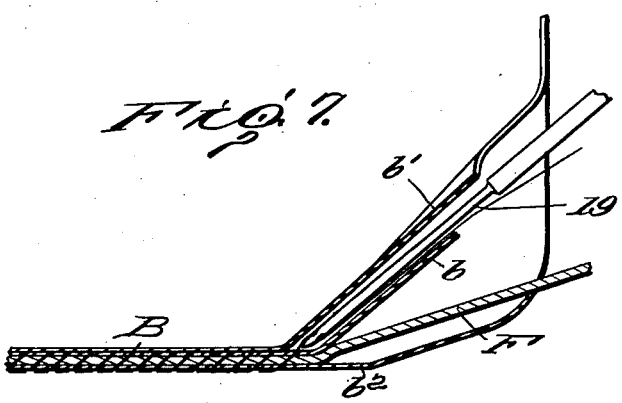
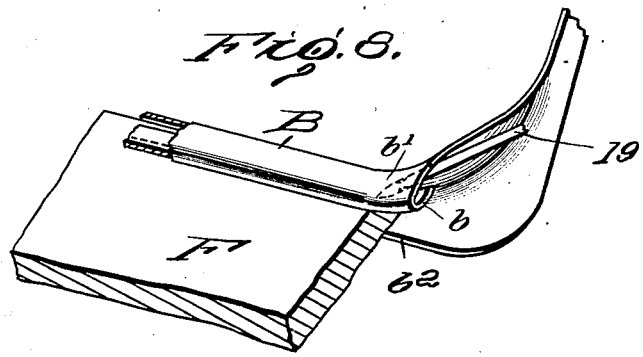
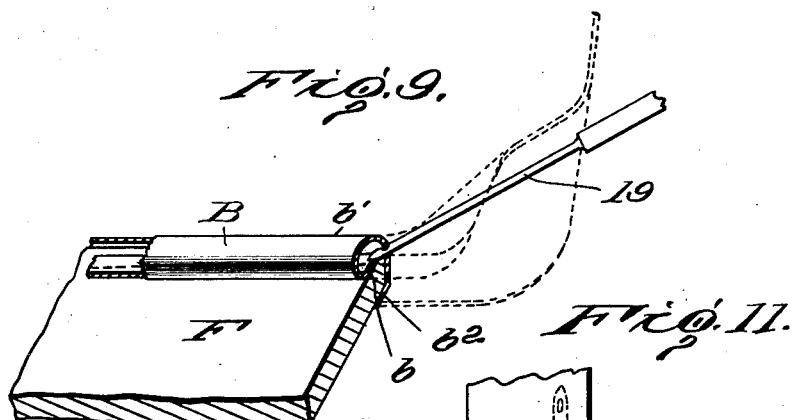
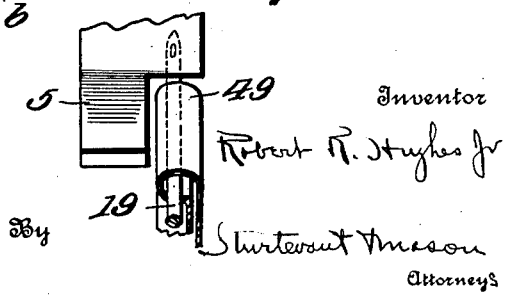

1,573,836

UNITED STATES PATENT OFFICE.

ROBERT R. HUGHES, JR., OF UTICA, NEW YORK, ASSIGNOR TO UNION SPECIAL MACHINE COMPANY, OF CHICAGO, ILLINOIS, A CORPORATION OF ILLINOIS.

MACHINE FOR FORMING CONCEALED STITCHES.

Application filed July 11, 1919. Serial No. 310,073.

*To all whom it may concern:*

Be it known that I, ROBERT R. HUGHES, Jr., a citizen of the United States, residing at Utica, in the county of Oneida, State of New York, have invented certain new and useful Improvements in Machines for Forming Concealed Stitches, of which the following is a description, reference being had to the accompanying drawing and to the figures of reference marked thereon.

The invention relates to new and useful improvements in machines for forming stitches which do not show on the right or face side of the material being stitched.

An object of the invention is to provide a machine for forming stitches which are concealed from view at the right or face side of the fabric being stitched, which machine includes a needle reciprocating in a path forming an obtuse angle with the plane of the work support and wherein the fabric section being stitched is guided and directed so that one edge portion is inturned or folded about the path of the needle and the inturned portion of the fabric is directed across the path of the needle at the stitching point so that said inturned portion is stitched to a fabric section underneath the same and the stitches concealed, as above stated.

A further object of the invention is to provide a sewing machine having a work support, stitching mechanism, feeding mechanism, and a fabric guiding and folding means which are so arranged and related to each other that a binding strip may be attached to a body fabric by stitches which pass through an inturned portion only of the binding strip at the face side of the body fabric, the stitching thread also being passed through the body fabric and the binding strip at the opposite face of the body fabric thereby securing the binding to the body fabric by a single line of stitches, which are concealed from view at the right or face side of the body fabric.

A further object of the invention is to provide a machine of the above character having a needle which reciprocates in the guiding recess of the folder with means for supporting said needle whereby the path of reciprocation may be varied both by changing the inclination of the needle to the vertical and also by shifting the needle bodily in a direction substantially at right angles to the feed of the fabric.

These and other objects will in part be obvious and will in part be hereinafter more fully disclosed.

In the drawings which show by way of illustration one embodiment of the invention—

Figure 1 is a front view of a machine embodying my improvements;

Figure 2 is an end view of the same from the left-hand end of the machine;

Figure 3 is an end view of the machine from the right-hand driving wheel end of the machine;

Figure 4 is a plan view of the parts directly beneath the work support, the standard for the main shaft being in section;

Figure 5 is a vertical sectional view showing a portion of the feeding mechanism, the looper and support therefor, the looper being at the forward end of its stroke;

Figure 6 is a similar view but showing the looper at the rear end of its stroke;

Figure 7 is a view in section showing a binding strip, a fabric section and the position of the needle as it is about to enter the folded-in edge of the binding strip and the body fabric;

Figure 8 is a perspective view of the same parts, as shown in Figure 7;

Figure 9 is also a perspective view of the same parts with the binding strip in section and in dotted lines, to show the point where the needle penetrates the binding strip;

Figure 10 is a vertical sectional view through the throat plate at the needle slot, also showing a portion of the presser foot, the fabric guide and the feed dog;

Figure 11 is a plan view of a portion of the presser foot and the end of the folding guide;

Figure 12 is a longitudinal sectional view of the needle bar and its disengaging means;

From certain aspects, the invention is directed broadly to a sewing machine for forming concealed stitches, that is, stitches which do not show on the right or face side of the fabric being stitched. In carrying out the invention, I have provided a sewing machine having a work support with a stitching mechanism which includes a reciprocating needle disposed so as to operate in a path forming an obtuse angle with the plane of the work support. Cooperating with the needle beneath the work support is any suitable complemental stitch forming mechanism. The fabric to be stitched is directed to the stitching mechanism by a feeding mechanism. Cooperating with said feeding mechanism is a presser foot having a fabric engaging surface in rear of the needle. A fabric guide is placed in front of said fabric engaging surface of the presser foot, which guide is arranged and constructed so as to inturn or fold the edge portion of a fabric about the path of the needle and direct the inturned portion across the path of the needle and underneath the presser foot so that the needle will penetrate said inturned portion and thereby lay the needle thread which is formed into loops for uniting the parts within the folded portions of the fabric. The needle reciprocates in the guiding scroll of the fabric guide and in order that the needle may be properly centered relative to the scroll, particularly when guides of different sizes are used, I have provided means whereby said needle may be swung so as to vary the angle of the path of reciprocation of the needle to the work support and I have also provided means whereby the needle may be swung bodily in a direction substantially at right angles to the line of feed. This also insures the positioning of the needle so that the thread will be caused to enter the folded-in portion of the strip close to the fold therein.

From another aspect the invention is directed broadly to a machine for applying a binding strip to a body fabric by a single line of stitches which are concealed in the manner above described.

As heretofore practiced, two operations have been necessary in order to place a binding strip about the body portion of a fabric, but by my invention, I am able to stitch a binding to a body fabric with a single line of stitches passing through an inturned portion of the binding strip on the right or face side of the garment, thence through the garment, and the underneath portion of the binding strip at the opposite face of the body fabric, the stitching threads for securing the binding strip to the body fabric being entirely concealed from view on the right or face side of the body fabric. To accomplish this, the guide carrying the scroll is in the form of a binder and the edge portion of the body fabric is led through the body fabric guiding portion of the binder.

The invention will be more clearly understood by reference in detail to the drawings, which show one embodiment of the invention. In these drawings, I have shown a sewing machine consisting of a bed plate 1, carrying a standard 2, supporting an overhanging arm 3. Mounted in the overhanging arm 3 is a presser bar 4, carrying a presser foot 5. Mounted on the bed plate 1 is a work support 6, on which the material to be stitched is supported. Cooperating with the presser foot 5 is a feed dog 7, carried by a feed bar 8, which is raised and lowered by an eccentric 9 on the main shaft 10. This main shaft 10 is mounted in suitable bearings carried by the ped plate and is driven by a belt wheel 11. The feed bar 8 is connected to a feed rocker 12 at the rear of the machine and said feed rocker 12 is provided with an arm 13 which is connected to a link 14 and this link in turn is connected to an eccentrically located pin carried by a disk 14ª mounted on the extreme left hand end of the main shaft 10. The above parts of the machine are of the usual construction and further detail description thereof is not thought necessary.

The needle bar in the present embodiment of the invention instead of reciprocating in the usual needle head at the forward end of the arm 3, reciprocates in a bracket 15 which is secured to the needle head and extends forwardly therefrom. Said bracket is provided with bearings 16 and 17, in which the needle bar, indicated at 18, reciprocates. This bracket is a two part bracket and the construction and purpose of the same will be hereinafter described in detail. The needle bar carries a needle 19. Mounted in a suitable bearing in the bracket 15 is a short shaft 20. This shaft carries an arm 21 which is connected to a link 22 and the link in turn is connected to a lug projecting from a collar 23 fixed to the needle bar, so that as the shaft 20 oscillates, the needle bar will be reciprocated. The shaft 20 also carries an arm 24 which is connected to a link 25. This link 25 is pivoted to the lower end of an arm 26, which is fixed to a shaft 27 mounted to oscillate in bearings 28 and 29 carried by a bracket 30, which is secured to the overhanging arm 3. The shaft 27 carries a second arm 31, which is pivotally connected at 32 to a link 33. The link 33 is in turn pivoted at 34 to an eccentric strap 35. The eccentric strap 35 co-operates with an eccentric on the main shaft 10. The upper end of this eccentric strap is connected to a ball stud 36 carried by a rock lever 37, which is pivoted at 38 to the standard 2 of the machine. Through the train of mechanism above described, the needle bar is reciprocated in its bearings and this causes the needle to pass through the fabric or fabric sections and beneath the work support where the needle thread loop formed thereby is entered by the looper.

The looper co-operating with the needle is of the threaded type and is illustrated at 39 in the drawings. Said looper is fixed to a looper carrier 40 which in turn is pivoted to a looper rocker 41. The axis of the looper carrier is indicated by the line x—x, in Figures 5 and 6 of the drawings. The looper rocker 41 is mounted at one end on a short shaft 42, which is journaled in a bracket 43. The other end of the rocker is mounted on a short stub shaft extending into the bracket 44. Secured to the shaft 42 is a yoke 44' which co-operates with an eccentric on the main shaft 10 to give the looper its needle avoiding movement. The looper carrier is rocked on its axis on the looper rocker by means of a link 45, which link is pivoted at 46 to the rock lever 37. Particular attention is called to the position of the looper carrier. The axis x—x of this looper carrier approaches parallelism with the needle 19. When the needle begins to ascend the looper moves forwardly into the needle loop. This position of the parts is indicated in Figure 6. After the looper has entered the needle thread loop and the needle has ascended to the upper end of its stroke, then the looper is moved laterally for its needle avoiding movement and operates in conjunction with the feed to open the looper thread triangle for the entrance of the needle. As the looper moves forwardly into the needle thread loop it moves above the needle and as the looper rocks over for its needle avoiding movement, it is moved to a position below the needle. A previously formed stitch is carried rearwardly by the feed and this, together with the movement of the looper, as above noted, positions the looper thread triangle for the needle to enter.

A particular feature of the stitch forming mechanism which is new in the present machine is the inclining of the needle relative to the upper face of the work support or fabric engaging surface of the presser foot and the disposition of the looper so that it swings about an axis substantially parallel with the needle and moves from a position above the needle to a position below the same for its needle avoiding movement.

The material is directed to the stitching mechanism by a fabric guide 47. This fabric guide 47 is carried by a supporting bracket 48. The guide, as illustrated in the drawings, is of a type for attaching a binding strip to a body fabric and is usually referred to as a binder. In Figures 7 to 9, inclusive, I have shown a body fabric, indicated at F, to which a binding strip, indicated at B, is stitched by my improved stitching mechanism. The upper edge of the binding strip is folded in, as indicated at $b$. The infolded edge $b$ passes at one side of the path of the needle 19, while the body portion of the strip adjacent the folded in portion, and indicated at $b'$, passes on the other side of the path of the needle 19. At the normal stitching point, the fabric sections are deflected from their inclined path of movement relative to the work support, owing to the passing of the binding strip and body fabric F underneath the presser foot. This change in the direction of movement of the binding strip causes the folded in edge to cross the needle path. This is clearly shown in Figure 7 of the drawings. The needle, therefore, as it descends will penetrate the folded in edge $b$ of the binding strip and lay the needle thread between this folded in edge $b$ and the adjacent portion of the binding strip indicated at $b'$. Therefore, the needle thread will be completely concealed by the binding strip itself on the right or face side of the fabric which is the upper side, as the fabric is stitched in the machine. The other edge of the binding strip, indicated at $b^2$ passes underneath the fabric and the needle will pass through this lower edge $b^2$ of the binding strip and thence secure the binding strip to the fabric F.

The binding strip B passes through the receiving end $47^a$ of the guide 47 and thence through the body portion of the guide which is shaped so as to bring about a folding of the strip in the manner above described. Said guide 47 is provided with a scroll or guiding section 49 which assists in the folding of the strip and the needle reciprocates in the scroll section 49 of the folding guide, so that the binding strip is folded about the needle. It is this disposition of the guide, relative to the needle, so that the needle will pass within the folded parts of the fabric which is being folded, that is one of the essential features of the invention. The particular shaping of the guide and the number of needles used may vary with the desired result to be accomplished, but the broad invention consists in the location of the binder for the fabric or the fabric sections relative to the stitching mechanism, so as to accomplish the result of depositing the stitching thread or threads within folded parts of the binding, thereby concealing the thread with which the binding is stitched at the face side of the body fabric, but at the same time securely stitching the binding about the body portion of said body fabric.

It will be noted that the binder 47 is located in front of the presser foot and portions of the guide are disposed between the needle and the presser foot. It will also be noted that the needle in entering the fabric passes through the fabric in front of the presser foot. This is to permit the fabric strip which is folded about the path of the needle to also pass beneath the presser foot.

In order to provide means for shifting the needle in the guiding recess or scroll of the folder, I have formed the bracket 15, as above noted, as a two part bracket. One of said parts, indicated at 15$^a$ is provided with a sleeve 15$^c$ which is mounted on a bar 15$^d$ carried by the overhanging arm. Said bar is secured to the arm and the bracket section 15$^a$ may be adjusted thereabout and held in adjusted position by set screws 15$^e$. By swinging the bracket 15 around the bar 15$^d$, I am able to shift bodily the position of the needle in a direction substantially at right angles to the line of feed. This aids greatly in the positioning of the needle so that it will pass with proper clearance to the guiding recess in the folding guide and permit a limited range of adjustment of the folding device and the exchange of one folding device for another. The other section of the bracket 15 is indicated at 15$^b$. Said section 15$^b$ is pivoted at 15$^f$ to the bracket section 15$^a$ by means of a suitable screw. Said bracket 15$^b$ is slotted at 15$^g$ and a screw 15$^h$ passing therethrough and through the bracket section 15$^a$ serves as a means for holding said bracket section 15$^b$ in various adjusted positions, and said bracket is, therefore, capable of being adjusted about the pivot screw 15$^f$ and then clamped in adjusted position, as above noted, by the screw 15$^h$. This enables the path of movement of the needle to be angularly adjusted in a vertical plane containing the line of feed and further aids in the positioning of the needle relative to the guiding recess of the folding device and also in the positioning of the needle relative to the fold in the strip of fabric which is being stitched.

The needle reciprocates within the section 49 of the guide 47 and when at its extreme upper position in the normal stitching operation of the machine, said needle eye is still within the section 49. In order to render the needle accessible for threading, I have provided a special form of needle bar which is shown in detail in Figure 12 of the drawings. Said needle bar 18 consists of an outer sleeve 18$^a$ on which the collar 23 is clamped. Within this outer sleeve is a rod 18$^b$ to which the needle 19 is clamped, in the usual manner. Said sleeve 18$^a$ is formed with a slot 18$^c$ adjacent its lower end and the rod 18$^b$ carrying the needle is provided with a rib 18$^d$ which runs in this slot 18$^c$ and prevents the rod from turning relative to the sleeve. Mounted on the collar 23 is a hollow post 50. Within said hollow post is a rod 51, carrying a pin 52 which extends through a slot in the post. Mounted freely on the post is a plate 53, carrying pins 54 which extend through openings in the outer sleeve 18$^a$ and engage recesses 55 formed in the rod 18$^b$. A spring 56 is coiled about the post and presses against a head on the post, forcing the plate 53 inwardly, thus causing the pins to be yieldingly held in the recesses. The rod 51 has a knurled head 57 by means of which it may be pulled outwardly, so that the pin 52 will engage the plate and pull the pins 54 out of their recesses. When the pins 54 have been drawn from the recesses 55, then the operator may grasp the thread guide 58 at the upper end of the rod 18$^b$ and slide said rod lengthwise in the sleeve 18$^a$, thus withdrawing the needle from the guide, so that the eye is accessible for threading. After the needle has been threaded, then the operator pushes the rod 18$^b$ downwardly in the sleeve and the pins 54 will spring into the recesses 55, and thence the parts of the needle bar are together. When the pins 54 are released from the rod 18$^b$, it is held from turning relative to the sleeve and the reciprocating means for the needle bar, by means of the rib 18$^d$ engaging the slot 18$^c$.

Mounted in the end of the shaft 27 is an arm 59 which projects forwardly and carries an adjustable thread eye 60 through which the thread is led on its way to the needle eye and this arm oscillating with the shaft 27 serves with the thread guides 58 and 61 and thread-eyelet on bar 15$^d$ as a thread controller for the needle thread, the guide 61 being mounted on the bracket 15.

In the operation of my machine, a new method of forming concealed stitches is carried out and this method is described and claimed in my co-pending application filed May 29, 1919, Serial No. 300,650 (patented January 23, 1923, #1,442,807).

It is obvious that minor changes in the details of construction and the arrangement of parts of the mechanism specifically described may be made without departing from the spirit of the invention, as set forth in the appended claims.

Having thus described my invention, what I claim as new and desire to secure by Letters Patent, is:

1. A machine for stitching fabrics and concealing the stitches from view on the right or face side of the fabric, including in combination, a work support, stitch forming mechanism including a reciprocating needle operating in a path forming an obtuse angle with the plane of the work support, complemental stitch forming mechanism cooperating with said needle, means for folding and guiding the edge portion of a fabric around the path of the needle, a presser foot having a fabric engaging surface in rear of the needle, a feeding mechanism for feeding the fabric underneath the presser foot, said guiding means being disposed relative to the needle and the presser foot so as to direct the inturned portion of the fabric across the path of the needle whereby said inturned portion is stitched to a fabric section underneath the same.

2. A machine for applying a concealed stitched binding to a body fabric including in combination a work support, stitch forming mechanism including a needle reciprocating in the path forming an obtuse angle with the plane of the work support, complemental stitch forming mechanism co-operating with said needle, feeding mechanism including a feed dog, a presser foot cooperating with the feed dog and having a fabric engaging surface in rear of the needle, a binder having an upper scroll portion for inturning the upper edge of a binding strip, said scroll being disposed about the path of the needle so as to fold an inturned portion of the binding strip about the path of the needle, said binder being disposed relative to the body fabric so as to direct the underneath portion of the binding strip below the body fabric whereby the inturned portion of the binding strip, the body fabric and the underneath portion of the binding strip as they pass under the presser foot will cross the path of the needle and the binding strip be stitched to the body fabric by a single line of stitches concealed by the binding strip on the upper or face side of the body fabric.

3. The combination of a work support, a needle mounted to reciprocate in a path inclined to the fabric engaging surface of the work support, a feeding mechanism for feeding the fabric across the work support, a presser foot having a fabric engaging surface disposed directly in rear of said needle, a fabric guide mounted in fixed relation to the needle path and having a section separate from the presser foot located between the needle and said fabric engaging section of the presser foot, whereby the fabric being stitched may be directed partly around the needle path to the stitching point, and thus caused to cross the needle path at the stitching point.

4. The combination of a work support, a needle, a presser foot having a fabric engaging surface disposed directly in rear of said needle, a fabric guide separate from the presser foot and having a section located between the needle and said fabric engaging section of the presser foot, whereby a fabric being stitched may be directed partly about the needle path to the stitching point and thence caused to cross the needle path at the stitching point as said section to be stitched passes beneath the presser foot, said needle and said guide being disposed at an obtuse angle to the fabric engaging surface of the presser foot.

5. The combination of a work support, a needle, a presser foot having a fabric engaging surface disposed directly in rear of said needle, a fabric guide having a section located between the needle and said fabric engaging section of the presser foot, whereby a fabric being stitched may be directed partly about the needle path to the stitching point and thence caused to cross the needle path at the stitching point as said section to be stitched passes beneath the presser foot, said needle and said guide being disposed at an acute angle to the fabric engaging surface of the presser foot.

6. The combination of a work support, a presser foot, a feed dog co-operating with said presser foot, a needle, said presser foot having a fabric engaging surface in rear of the needle, a guide having a section disposed between the needle path and said fabric engaging surface of the presser foot, said guide extending to the opposite side of said needle path for directing a folded edge in a fabric section partly about the needle path to the stitching point, and thence across the needle path as it passes between the feed and the presser foot.

7. The combination of a work support, a presser foot, a feed dog co-operating with said presser foot, a needle, said presser foot having a fabric engaging surface in rear of the needle, a guide having a section disposed between the needle path and said fabric engaging surface of the presser foot, said guide extending to the opposite side of said needle path for directing a folded edge in a fabric section partly about the needle path to the stitching point and thence across the needle path as it passes between the feed and the presser foot, said needle being disposed at an acute angle to the fabric engaging surface of the presser foot.

8. The combination of a work support, a presser foot, a needle, a needle bar carrying said needle being disposed in a line at an acute angle to the work support, a thread carrying looper, a looper carrier therefor, means for oscillating said looper carrier, and means for swinging the looper carrier for giving a needle avoiding movement to the looper, said looper carrier being disposed so that the axis thereof is substantially parallel with the path of the needle.

9. The combination of a work support, a presser foot, a needle, a needle bar carrying said needle being disposed in a line at an acute angle to the work support, a thread carrying looper, a looper carrier therefor, means for oscillating said looper carrier, and means for swinging the looper carrier for giving a needle avoiding movement to the looper, said looper carrier being disposed so that the axis thereof is substantially parallel with the path of the needle, and a fabric guide disposed relative to said needle so as to partly encircle the path thereof.

10. The combination of a work support, a presser foot, a needle, a needle bar carrying said needle, said needle bar being disposed in a line at an acute angle to the work support, a thread carrying looper, a looper carrier therefor, means for oscillating said looper carrier, means for swinging the looper carrier for giving a needle avoiding movement to the looper said looper carrier being disposed so that the axis thereof is substantially parallel with the path of the needle, and a fabric guide disposed relative to said needle so as to partly encircle the path thereof, said needle bar being formed in sections which may be disconnected so as to permit the needle to be withdrawn from the guide for threading.

11. The combination of a work support, a fabric guide, a needle bar, said needle bar being formed in sections and movable one upon the other, a needle carried by one of said movable sections, a fabric guide partially encircling said needle, actuating mechanism for said needle connected to the other section whereby one of said sections of the needle bar may be moved upon the other to permit the needle to be withdrawn from the guide for the purpose of threading.

12. The combination of a work support, a needle, a needle bar supporting said needle, said needle bar being disposed in a line forming an acute angle with the work support, a guide for guiding a fabric section to the needle, said guide being disposed so as to partially encircle the needle and direct a folded edge of the fabric section partially about the needle path, said needle bar being formed in sections, whereby the needle may be withdrawn from the guide for the purpose of threading.

13. The combination of a work support, an overhanging arm, a bracket carried by the overhanging arm at the free end thereof and projecting forwardly of said arm, a needle bar mounted to reciprocate in said bracket, said needle bar being disposed in a line forming an acute angle with the work support, a guide partially surrounding the needle path for directing a folded in edge or fabric section partially about the needle path to the stitching point, and means for causing the folded in edge to cross the path at the stitching point.

14. The combination of a work support, a feeding mechanism, an overhanging arm, a bracket carried by the free end of said overhanging arm and projecting forwardly therefrom in a direction parallel with the line of feed, a needle bar, a needle carried thereby, said needle bar being disposed in a line inclined to the work support and lying in a plane parallel with the line of feed, a threaded looper co-operating with said needle, a guide for folding the edge of the fabric and directing the same about the needle path to the stitching point, a presser foot underneath which the fabric passes, said guide being disposed relative to the presser foot so that the folded in edge will cross the needle path as it passes under the presser foot.

15. The combination of a work support, a feeding mechanism, an overhanging arm, a bracket carried by the free end of said overhanging arm and projecting forwardly therefrom in a direction parallel with the line of feed, a needle bar, a needle carried thereby, said needle bar being disposed in a line inclined to the work support and lying in a plane parallel with the line of feed, a threaded looper co-operating with said needle, a guide for folding the edge of the fabric and directing the same about the needle path to the stitching point, a presser foot underneath which the fabric passes, said guide being disposed relative to the presser foot so that the folded in edge will cross the needle path as it passes under the presser foot, a looper carrier on which said looper is mounted, a looper support on which said looper carrier is pivotally mounted, means for oscillating said support, and means for oscillating said carrier.

16. The combination of a work support, a feeding mechanism, an overhanging arm, a bracket carried by the free end of said overhanging arm and projecting forwardly therefrom in a direction parallel with the line of feed, a needle bar, a needle carried thereby, said needle bar being disposed in a line inclined to the work support and lying in a plane parallel with the line of feed, a threaded looper co-operating with said needle, a guide for folding the edge of the fabric and directing the same about the needle path to the stitching point, a presser foot underneath which the fabric passes, said guide being disposed relative to the presser foot so that the folded in edge will cross the needle path as it passes under the presser foot, a looper carrier on which said looper is mounted, a looper support on which said looper carrier is pivotally mounted, means for oscillating said support, and means for oscillating said carrier, said carrier being disposed so that the axis thereof is substantially parallel with the path of movement of the needle.

17. The combination of a work support, a presser foot, a needle, a needle bar carrying said needle, a looper cooperating with said needle, means for operating said looper, and a fabric guide disposed relative to said needle so as to partly encircle the path thereof, said needle bar being formed in sections one of which carries the needle and the other of which is connected to the actuating mechanism for operating the needle bar, and means whereby said sections may be disconnected so as to permit the needle to be withdrawn from the guide for threading.

18. The combination of a work support, a feeding mechanism, a stitch forming mechanism including a needle, a needle bar supporting said needle, an overhanging arm, a bracket carried by said arm in which said needle bar reciprocates, said needle bar being disposed so as to reciprocate in a path in a line inclined to the surface of the work support, a rock shaft carried by the overhanging arm, means for operating said rock shaft, means operated by said rock shaft for reciprocating said needle bar, means for supporting said bracket on said arm whereby the needle may be adjusted bodily in a direction at right angles to the line of feed.

19. The combination of a work support, a feeding mechanism, a stitch forming mechanism including a needle, a needle bar supporting said needle, an overhanging arm, a bracket carried by said arm in which said needle bar reciprocates, said needle bar being disposed so as to reciprocate in a path in a line inclined to the surface of the work support, a rock shaft carried by the overhanging arm, means for operating said rock shaft, means operated by said rock shaft for reciprocating said needle bar, means for supporting said bracket on said arm whereby the needle may be adjusted bodily in a direction at right angles to the line of feed, said bracket being formed in two parts, one of which is adjustable upon the other whereby the path of movement of the needle may be angularly adjusted in a vertical plane relative to the work support.

20. The combination of a work support, a feeding mechanism, a stitch forming mechanism including a needle, a needle bar supporting said needle, an overhanging arm, a bracket carried by said arm in which said needle bar reciprocates, said needle bar being disposed so as to reciprocate in a path in a line inclined to the surface of the work support, a rock shaft carried by the overhanging arm, means for operating said rock shaft, means operated by said rock shaft for reciprocating said needle bar, means for supporting said bracket on said arm whereby the needle may be adjusted bodily in a direction at right angles to the line of feed, said bracket being formed in two parts, one of which is adjustable upon the other whereby the path of movement of the needle may be angularly adjusted in a vertical plane relative to the work support, and a fabric guiding device having a guiding recess in which the needle reciprocates.

21. The combination of a work support, a feeding mechanism, an overhanging arm, a bracket carried by said overhanging arm, a needle bar reciprocating in said bracket, a needle carried thereby, a looper cooperating with said needle, means for adjusting said bracket for shifting the path of movement of said needle bodily in a direction substantially at right angles to the line of feed, and a fabric guiding device having a guiding recess in which the needle reciprocates.

22. The combination of a work support, a feeding mechanism, an overhanging arm, a bracket carried by said overhanging arm, a needle bar reciprocating in said bracket, a needle carried thereby, a looper cooperating with said needle, means for adjusting said bracket for shifting the path of movement of said needle bodily in a direction substantially at right angles to the line of feed, a fabric guiding device having a guiding recess in which the needle reciprocates, and a presser foot located in rear of the guiding device and in rear of the path of the needle.

23. The combination of a work support, a feeding mechanism, an overhanging arm, a bracket carried by said overhanging arm, a needle bar reciprocating in said bracket, a needle carried thereby, a looper co-operating with said needle, means for adjusting said bracket for shifting the path of movement of said needle bodily in a direction substantially at right angles to the line of feed, said bracket being formed in sections one of which is adjustable on the other whereby the angular position of the needle relative to the work support may be adjusted.

24. The combination of a work support, a feeding mechanism, an overhanging arm, a bracket carried by said overhanging arm, a needle bar reciprocating in said bracket, a needle carried thereby, a looper co-operating with said needle, means for adjusting said bracket for shifting the path of movement of said needle bodily in a direction substantially at right angles to the line of feed, said bracket being formed in sections, one of which is adjustable on the other whereby the angular position of the needle relative to the work support may be adjusted, and a fabric guiding device having a guiding recess in which said needle reciprocates.

25. The combination of a work support, an overhanging arm, a needle bar supported by said overhanging arm, a needle carried thereby, a looper co-operating with said needle, said supporting means for said needle bar including devices whereby the needle bar may be adjusted bodily about a vertical axis containing a plane passing through the needle bar and also about a horizontal axis contained in a plane at right angles to the needle bar.

In testimony whereof, I affix my signature.

ROBERT R. HUGHES, Jr.